(12) United States Patent
Zalewski

(10) Patent No.: US 10,313,740 B2
(45) Date of Patent: *Jun. 4, 2019

(54) INTEGRATION OF CONTROL DATA INTO DIGITAL BROADCAST CONTENT FOR ACCESS TO ANCILLARY INFORMATION

(75) Inventor: Gary M. Zalewski, Oakland, CA (US)

(73) Assignee: Sony Interactive Entertainment America LLC, San Mateo, CA (US)

( * ) Notice: Subject to any disclaimer, the term of this patent is extended or adjusted under 35 U.S.C. 154(b) by 122 days.

This patent is subject to a terminal disclaimer.

(21) Appl. No.: 13/560,213

(22) Filed: Jul. 27, 2012

(65) Prior Publication Data

US 2012/0291065 A1    Nov. 15, 2012

Related U.S. Application Data

(63) Continuation of application No. 12/128,096, filed on May 28, 2008, now Pat. No. 8,239,896.

(51) Int. Cl.
H04N 7/10         (2006.01)
H04N 21/435       (2011.01)
H04H 20/28        (2008.01)
H04H 60/13        (2008.01)
H04H 60/73        (2008.01)
(Continued)

(52) U.S. Cl.
CPC .......... *H04N 21/435* (2013.01); *H04H 20/28* (2013.01); *H04H 60/13* (2013.01); *H04H 60/73* (2013.01); *H04N 21/235* (2013.01); *H04N 21/431* (2013.01); *H04N 21/6543* (2013.01); *H04N 21/812* (2013.01); *H04H 40/18* (2013.01)

(58) Field of Classification Search
CPC ............. H04N 21/812; H04N 21/4331; H04N 21/435; H04N 21/235
USPC ............................... 725/32–61; 709/217–232
See application file for complete search history.

(56) References Cited

U.S. PATENT DOCUMENTS 5,805,155 A * 9/1998 Allibhoy ............ H04N 7/17318
                                              348/E5.108
5,929,849 A    7/1999 Kikinis
(Continued)

OTHER PUBLICATIONS

"ATSC Digital Television Standard Part 1—Digital Television System"—Advanced Television Systems Committee—(A/53, Part 1:2007), Jan. 3, 2007, 22 pages.
(Continued)

Primary Examiner — Annan Q Shang
(74) Attorney, Agent, or Firm — Penilla IP, APC

(57) ABSTRACT

Ancillary information associated with one or more images embedded in a digital broadcast data stream may be accessed by a digital broadcast receiving device. The device may include a receiver unit, a processor, and a memory. The processor may execute program instructions to access the ancillary information. Control data may be associated with one or more visual components of one or more video images. The control data and images may be combined into a digital broadcast data stream. The device may receive the images and control data. The images may be presented on a display device. The receiving device may use the control data to present or store a perceptible indication that ancillary information is associated with the visual components in conjunction with presenting the images. The device may use the control data to present or store the ancillary information in response to an input signal.

16 Claims, 6 Drawing Sheets

(51) Int. Cl.
  *H04N 21/235*    (2011.01)
  *H04N 21/431*    (2011.01)
  *H04N 21/6543*   (2011.01)
  *H04N 21/81*     (2011.01)
  *H04H 40/18*     (2008.01)

(56) References Cited

U.S. PATENT DOCUMENTS

| | | | |
|---|---|---|---|
| 5,946,646 A * | 8/1999 | Schena | H04L 29/06 |
| | | | 348/E7.071 |
| 6,240,555 B1 | 5/2001 | Shoff et al. | |
| 6,282,713 B1 * | 8/2001 | Kitsukawa et al. | 725/42 |
| 6,571,392 B1 | 5/2003 | Zigmond et al. | |
| 6,668,278 B1 * | 12/2003 | Yen | G06F 17/30867 |
| | | | 379/100.06 |
| 7,295,755 B2 * | 11/2007 | Ostermann | G06F 17/30817 |
| | | | 386/282 |
| 7,418,672 B2 * | 8/2008 | Stautner | H04N 5/44543 |
| | | | 348/E5.105 |
| 7,449,413 B1 * | 11/2008 | Achuthan | H01L 21/02068 |
| | | | 257/E21.304 |
| 7,904,579 B2 * | 3/2011 | Janik | G06F 1/1632 |
| | | | 709/219 |
| 7,958,156 B2 * | 6/2011 | Shriwas | G06F 17/30867 |
| | | | 707/796 |
| 8,064,751 B2 * | 11/2011 | Klausberger | G11B 27/034 |
| | | | 348/460 |
| 8,209,618 B2 * | 6/2012 | Garofalo | G06Q 10/06398 |
| | | | 382/232 |
| 8,239,896 B2 | 8/2012 | Zalewski | |
| 8,296,798 B2 * | 10/2012 | Lee | H04N 5/44543 |
| | | | 725/41 |
| 8,312,489 B2 * | 11/2012 | Nakamura | G06Q 30/02 |
| | | | 725/114 |
| 8,495,679 B2 * | 7/2013 | Labeeb et al. | 725/46 |
| 8,504,565 B2 * | 8/2013 | Pitts | G06F 17/30106 |
| | | | 707/736 |
| 2001/0013123 A1 | 8/2001 | Freeman et al. | |
| 2002/0129366 A1 | 9/2002 | Schein et al. | |
| 2002/0174438 A1 | 11/2002 | Cleary et al. | |
| 2002/0194592 A1 * | 12/2002 | Tsuchida et al. | 725/36 |
| 2003/0005441 A1 | 1/2003 | Inoue | |
| 2003/0110503 A1 * | 6/2003 | Perkes | H04N 7/17318 |
| | | | 725/86 |
| 2004/0010801 A1 * | 1/2004 | Kim | H04N 7/17336 |
| | | | 725/86 |
| 2004/0194149 A1 | 9/2004 | Kessler | |
| 2005/0137958 A1 * | 6/2005 | Huber | H04N 21/812 |
| | | | 705/37 |
| 2005/0193425 A1 * | 9/2005 | Sull | G06F 17/30817 |
| | | | 725/135 |
| 2005/0229225 A1 * | 10/2005 | Klausberger | G11B 27/034 |
| | | | 725/112 |
| 2005/0229227 A1 * | 10/2005 | Rogers | G06Q 30/02 |
| | | | 725/115 |
| 2007/0156872 A1 * | 7/2007 | Stoyanova | G06F 17/3089 |
| | | | 709/223 |
| 2008/0066100 A1 * | 3/2008 | Brodersen | G06F 17/30855 |
| | | | 725/35 |
| 2008/0097970 A1 * | 4/2008 | Olstad | H04N 21/47 |
| | | | 725/38 |
| 2008/0183742 A1 * | 7/2008 | Kapur | G06Q 30/02 |
| 2008/0313677 A1 * | 12/2008 | Lee | H04N 5/44543 |
| | | | 725/56 |
| 2009/0199242 A1 * | 8/2009 | Johnson | G06F 17/30781 |
| | | | 725/46 |
| 2013/0326572 A1 * | 12/2013 | Pitts | G06F 17/30144 |
| | | | 725/109 |

OTHER PUBLICATIONS

"ATSC Digital Television Standard Part 2—RF/Transmission System Characteristics"—Advanced Television Systems Committee—(A/53, Part 2:2007)—Jan. 3, 2007, 44 pages.
"ATSC Digital Television Standard Part 3—Service Multiplex and Transport Subsystem Characteristics"—Advanced Television Systems Committee—(A/53, Part 3, 2007)—Jan. 3, 2007, 27 pages.
"Time-Varying Sensitive Regions in Dynamic Multimedia Objects: a Pragmatic Approach to Content-Based Retrieval from Video" by Victoria Burrill, Thomas Kirste and Jochen Weiss, Information and Software Technology 1994, vol. 36, No. 4.
ATSC Recommended Practice: Implementation Guidelines for the ATSC Data Broadcast Standard (Doc. A/90)—Advanced Television Systems Committee—Jun. 10, 2001, 122 pages.
Cell Broadband Engine Architecture, copyright International Business Machines Corporation, Sony ComputerEntertainment Incorporated, Toshiba Corporation Aug. 8, 2005 which may be downloaded at http://cell.scei.co.jp/.
Final Office Action dated Apr. 19, 2011 for U.S. Appl. No. 12/128,096.
International Search Report and Written Opinion of the International Application No. PCT/US2009/043389, dated Jul. 1, 2009.
ISO/IEC 13818-1:2000 (E), International Standard, "Information technology—Generic Coding of Moving Pictures and Associated Audio Information: Systems", Dec. 1, 2000,174 pages.
Non-Final Office Action dated Nov. 10, 2010 for U.S. Appl. No. 12/128,096.
Non-Final Office Action dated Nov. 29, 2011 for U.S. Appl. No. 12/128,096.

* cited by examiner

US 10,313,740 B2

INTEGRATION OF CONTROL DATA INTO DIGITAL BROADCAST CONTENT FOR ACCESS TO ANCILLARY INFORMATION

PRIORITY CLAIM

This application is a continuation of and claims the priority benefit of U.S. patent application Ser. No. 12/128,096, filed May 28, 2008, now U.S. Pat. No. 8,239,896 the entire contents of which are incorporated herein by reference.

FIELD OF THE INVENTION

Embodiments of this invention are related to digital broadcasting and more specifically to updating data for services usable in conjunction with a digital broadcast signal.

BACKGROUND OF THE INVENTION

Since broadcast television was introduced in the 1930s, television stations and networks have been paid to advertise products and services in conjunction with scheduled programming. Such advertising is often in the form of commercials that are broadcast during breaks in program content. A common problem with such commercials from the point of view of the viewer is that they interrupt the programming that the viewer would like to watch. Another problem with commercials from the point of view of the advertiser is that it is difficult to track the effectiveness of a given ad in encouraging a given viewer to purchase something advertised in a commercial.

A further problem has been the development of the digital video recorders (DVR), which allows a viewer to "fast-forward" through commercials and thereby avoid their impact entirely. Many DVR systems also allow a viewer to "pause" or "rewind" a television program. This feature is commonly used by DVR users when television viewing is interrupted, e.g., by a telephone call. Some viewers may use a DVR to pause or even rewind a program to get a closer look at something shown in the course of a broadcast.

To enhance revenue streams for broadcasters and to make advertising less intrusive to viewers, some programs include advertising in a form referred to herein as "product placement." In this type of advertising, a product, or the logo or trademark for the product, appears in a television program as part of the program. For example, a program may show a character ostentatiously drinking from a can marked with the logo of a popular brand or soft drink or driving a particular make and model of automobile, with the manufacturer's trademark prominently displayed. Although these advertisements are less intrusive than conventional television commercials, their impact on consumers may be lessened for this very reason.

A major change in the nature of television for both advertisers and consumers arose with the advent of digital television. Introduced in the late 1990s, digital television (DTV) technology appealed to the television broadcasting business and consumer electronics industries as offering new consumer services and business opportunities that were impractical with previous analog television. Digital television is more flexible and efficient than analog television. When properly used by broadcasters, digital television allows higher-quality images and sound and more programming choices than analog does. In DTV moving images and sound are sent and received by means of discrete (digital) signals, in contrast to the analog signals used by analog television. Digital television includes, but is not limited to Digital Terrestrial Television (DTTV or DTT), which is an implementation of digital technology to provide a greater number of channels and/or better quality of picture and sound using aerial broadcasts to a conventional antenna (or aerial) as opposed to a satellite dish or cable connection.

The development of digital television has lead to many changes in television broadcasting and related industries. Many countries have mandated a change from an analog television signal format to a new digital format. One example of such a digital television broadcast standard was developed by the Advanced Television Systems Committee. With a conventional analog television broadcast, a video signal modulates a carrier wave signal that is broadcast by a transmission tower. A television set contains a receiver that detects broadcast signals. The receiver includes a tuner that selects a particular channel according to its carrier frequency and a demodulator that extracts the video signal from the modulated carrier signal. With a digital television signal, the video signal is generated in a digital format or an analog video signal is converted to a digital format to produce a digital signal. The carrier wave is modulated according to the digital signal format, e.g., using vestigial sideband (VSB) modulation. This new format allows data for additional digital services to be broadcast along with a regular television signal. Examples of such services may include real time stock quotes, sports, weather and traffic updates and other services traditionally associated with delivery via two-way media, such as the internet, digital wireless services or cellular telephone services.

Digital broadcasting allows broadcasters to provide ancillary data or control data associated with program content. For example, some digital radio broadcast signals include data identifying program content, such as a program title or the name and/or artist of a song played over a digital broadcast. A digital radio receiver can display this information, e.g., on a text display. Some systems can even use this data to allow a user to download content. This type of two-way activity is relatively easy to implement in digital radio, which is essentially a one dimensional audio medium. However, the multi-dimensional audio-video nature of television makes such two-way activity problematic for digital television systems.

The delivery of digital services by a primarily one-way medium through digital broadcast presents certain challenges and problems. Providing a link between programming broadcast over digital television broadcast channels and data that is accessible on demand presents certain problems and opportunities heretofore unrecognized in the art.

It is within this context that embodiments of the present invention arise.

SUMMARY OF THE INVENTION

According to an embodiment of the present invention, a method for accessing ancillary information associated with one or more images embedded in a digital broadcast data stream may be implemented in a digital broadcast receiving device configured to receive programming and data over a plurality of digital broadcast channels. A digital television broadcast signal may be received by the receiving device. The digital broadcast signal may include data representing one or more video images and control data associated with one or more visual components of the one or more video images. The one or more video images may be presented on a video display device associated with the digital broadcast receiving device. The control data may be used to present a perceptible indication that ancillary information is associated with the one or more visual components in conjunction with presenting the one or more video images with the display device. The control data may also be used to present the ancillary information with the display device in response to an input signal.

In some embodiments, the input signal may be a signal from a remote control associated with the digital broadcast receiving device. In some embodiments, the ancillary information includes one or more advertisements.

In some embodiments, the control data may be associated with one or more objects depicted in one or more of the video images. The control data may alternatively be associated with a context associated with the one or more video images.

In some embodiments, the perceptible indication may be displayed with the display device while presenting the one or more video images.

In some embodiments, displaying the perceptible indication may include presenting information guiding a percipient to the ancillary information that is associated with the control data using the display device. In some embodiments, displaying the perceptible indication may include superposing the information guiding the percipient to the ancillary information over one or more of the video images. In some embodiments, the information guiding the percipient to the ancillary information includes one or more links to one or more resources accessible via an electronic communications network. In some embodiments, the resources may be accessed via the one or more links in response to the input signal.

In some embodiments, the information guiding the percipient to the ancillary information may include a video image identifying the one or more visual components. The image may include one or more links. Each link may be associated with one or more of the visual components. Each link may be configured to provide access to the ancillary information associated with the corresponding visual component.

In some embodiments, displaying the perceptible indication may include pausing presentation of a program containing the one or more video images at a particular video image in response to a pause signal. One or more visual components in that image may be highlighted in a manner perceptible to a percipient. One or more links to the ancillary information may be associated with the one or more visual components. In such embodiments, the ancillary information associated with a particular visual component may be presented in response to a selection input.

In some embodiments, presenting the ancillary information may include storing the ancillary information in a memory associated with the digital broadcast receiving device and/or display device. In other embodiments, presenting the ancillary information may include using the control data as an input to a search engine coupled to the digital broadcast receiving device and/or display device and conducting a search with the search engine.

According to another embodiment of the invention, a digital broadcast receiving device may include a receiver unit, a processor coupled to the receiver unit and a memory coupled to the processor. The receiver unit may be configured to receive programming and data over one or more digital broadcast channels. A set of processor readable instructions may be embodied in the memory for execution on the processor. The instructions may be configured to implement the method described above.

In some embodiments, the digital broadcast receiving device may further comprise a video display device, which may be operably coupled to the processor.

In some embodiments, the digital broadcast receiving device may further comprise a backchannel coupled to the processor. The backchannel may include a network interface coupled to an electronic communications network.

In some embodiments, the digital broadcast receiving device may further comprise a remote control configured to interoperate with the processor. In such a case the input signal referred to in the method above may be a signal from the remote control.

According to another embodiment, a digital broadcast data stream having control data associated with one or more images in a digital broadcast data stream may be provided according to an inventive method. According to the method control data may be associated with one or more visual components of one or more video images. The control data may be configured facilitates access to ancillary data associated with the one or more visual components by a receiving device and/or display device usable with a digital broadcast signal generated from the digital broadcast data stream. The control data and the video images may be combined into a digital broadcast data stream.

The control data may be configured as in the method described above. For example, according to some embodiments, the control data may be associated with one or more objects depicted in one or more of the video images. According to other embodiments, the control data may be associated with a context of the one or more video images.

According to some embodiments, the digital broadcast data stream may be broadcast as a digital broadcast signal.

According to some embodiments, the control data may identify one or more hotspots associated with one or more video images. Each hotspot may provide a link to ancillary information associated with the one or more visual components.

BRIEF DESCRIPTION OF THE DRAWINGS

The teachings of the present invention can be readily understood by considering the following detailed description in conjunction with the accompanying drawings, in which.

DESCRIPTION OF THE SPECIFIC EMBODIMENTS

Although the following detailed description contains many specific details for the purposes of illustration, anyone of ordinary skill in the art will appreciate that many variations and alterations to the following details are within the scope of the invention. Accordingly, examples of embodiments of the invention described below are set forth without any loss of generality to, and without imposing limitations upon, the claimed invention.

Introduction

A digital television broadcast may include control data that allows a user to access ancillary information about visual components of one or more images in a program that is received as part of a digital television broadcast.

Figure 1:
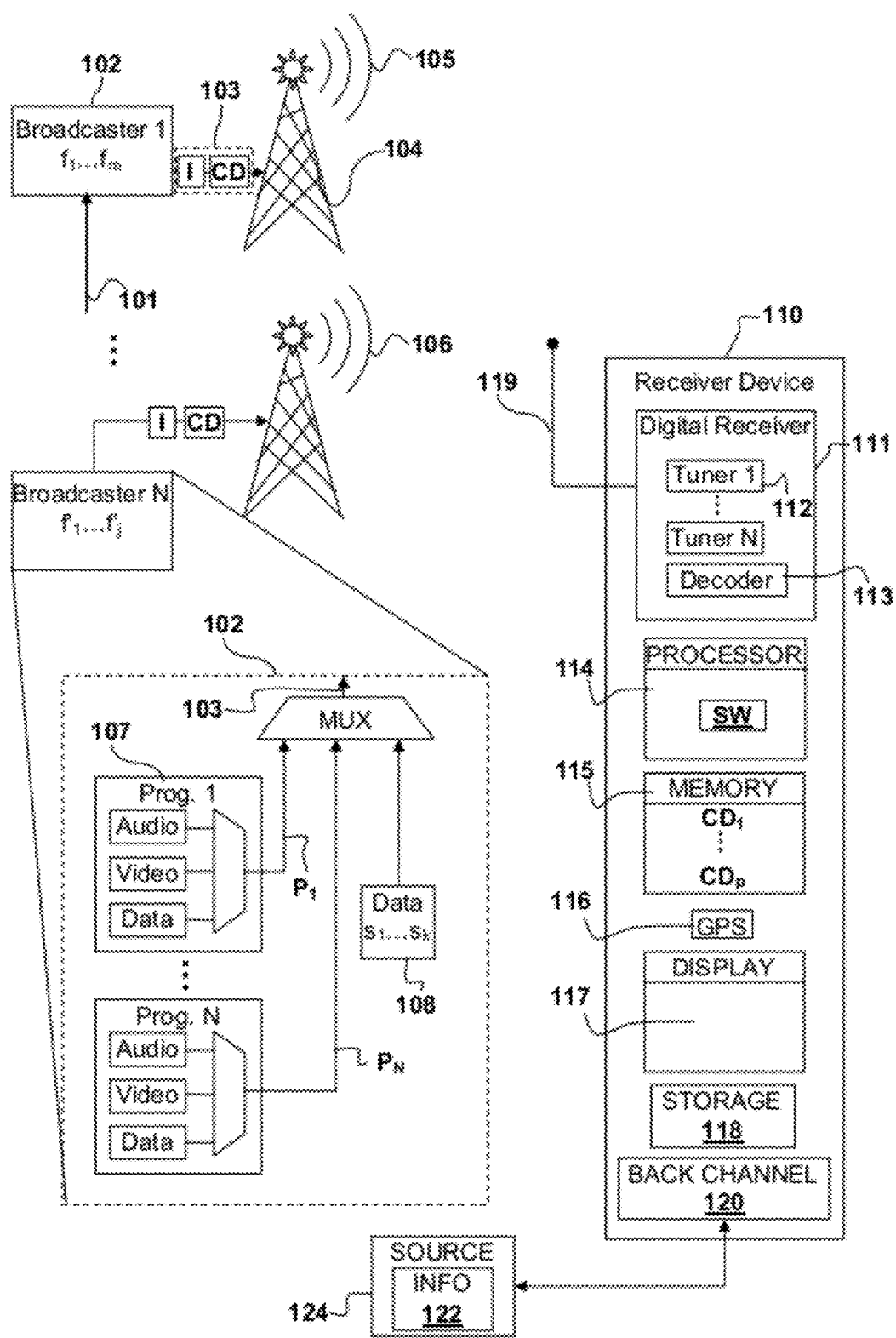
FIG. 1 is a schematic diagram illustrating a broadcast environment in which embodiments of the present invention may be employed.

FIG. 1 schematically illustrates a broadcast environment in which embodiments of the present invention may be employed. In such an environment broadcasters 102 receive or generate input data streams 101. The input data streams 101 are converted to digital broadcast data streams 103, which are converted to a digital broadcast signal 105 for reception by digital broadcast receivers 110. It is noted that for the sake of example, the two digital broadcast signals 105, 106 are shown as being transmitted from different towers 104. This is not to be construed as a limitation upon any embodiment of the invention. Alternatively, the two digital broadcast signals 105, 106 may originate from the same broadcast tower 104 and may be broadcast simultaneously, e.g., using frequency division multiplexing.

By way of example, a digital broadcast signal 105 may be a modulated radiation signal transmitted from a broadcast tower 104, e.g., in the form of an over-the-air broadcast, such as by radiofrequency electromagnetic wave signal. It is noted that the digital broadcast signal 105 transmitted by a given broadcast tower 104 may include multiple digital broadcast channels modulated at different carrier signal frequencies. Broadcast towers 104 associated with different broadcast units 102 may broadcast over different sets of frequencies. For example Broadcaster 1 may broadcast over a first set of carrier frequencies $f_1 \ldots f_m$ and Broadcaster N may broadcast over a different set of carrier frequencies $f'_1 \ldots f'_j$. There may be some overlap between the two sets of carrier frequencies.

Furthermore, the digital broadcast signal 105 may be transmitted in a form other than an over-the-air broadcast. Alternatively, embodiments of the invention may be used in conjunction with digital broadcasts transmitted over media such as cable (e.g., coaxial cable), optical fiber, or satellite transmission.

By way of example, the digital broadcast signal 105 may be configured in accordance with a digital broadcast standard. Examples of digital broadcast standards include, but are not limited to, the Digital Video Broadcasting (DVB) family of standards maintained in Europe and Australia, the Advanced Television Standards Committee (ATSC) family of standards developed for use in the United States and Canada, the Integrated Services Digital Broadcasting (ISDB) family of standards developed for use in Japan, Digital Multimedia Broadcasting (DMB) standard used in South Korea.

The DVB family of standards includes the DVB-S and DVB-S2 standards for satellite television, the DVB-T and DVB-T2 standards for terrestrial television, DVC-C for cable television and DVB-H for mobile television and other DVB standards which have been or may be developed. The ATSC family of standards includes the ATSC standard for terrestrial television broadcasts and the ATSC M/H standard for broadcasts to mobile and handheld devices. The ISDB family of standards includes the IDSB-S, ISDB-T, and ISDB-C standards, which were developed for satellite, terrestrial and cable television respectively.

By way of example, and not by way of limitation, the digital broadcast signal 105 may be configured according to the ATSC or ATSC-M/H standards. The ATSC standard is described in detail, e.g., in "ATSC Digital Television Standard Part 1—Digital Television System" (A/53, Part 1:2007), "ATSC Digital Television Standard Part 2—RF/Transmission System Characteristics" (A/53, Part 2:2007), and "ATSC Digital Television Standard Part 3—Service Multiplex and Transport Subsystem Characteristics" (A/53, Part 3, 2007), the disclosures of all three of which are incorporated herein by reference. The ATSC Data Broadcast Standard is described, e.g., in (ATSC Recommended Practice: Implementation Guidelines for the ATSC Data Broadcast Standard (Doc. A/90)", which is incorporated herein by reference.

The input data stream 101 may include data streams from multiple sources. For example, within the broadcaster 102 data streams for different television program 107 may be made up of audio, video and ancillary data streams. These data streams may be multiplexed to form a program data stream associated with a given program 107. Multiple program data streams may be multiplexed with each other into the broadcast data stream 103. The digital broadcast data stream 103 may include data representing one or more video images I and control data CD associated with one or more visual components of the one or more video images I.

As used herein, the term "visual component" refers to a visible portion of one or more video images that is associated with an object or context. Examples of objects include persons or things depicted within a video image. Examples of contexts include concepts, persons or things having an association with a person or thing depicted in a video image. For example, a manufacturer of a product may be associated with a product or logo depicted in a video image even though the manufacturer is not depicted.

Furthermore, one or more data service data streams 108 for broadcast data services $s_1 \ldots s_k$ not specifically associated with a given program 107 may be overlaid (e.g., multiplexed) with the program data streams $P_1 \ldots P_N$ into the broadcast data stream 103.

The data streams 101 that make up digital broadcast data stream 103 may be subject to data transforms, such as source coding and compression. As used herein, "source coding and compression" refers to bit rate reduction methods, also known as data compression, appropriate for application to the video, audio, and ancillary digital data streams. The term "ancillary data" includes control data, conditional access control data, and data associated with the program audio and video services, such as closed captioning. "Ancillary data" can also refer to independent program services. The broadcast unit 102 may include a coder configured to minimize the number of bits needed to represent the audio and video information. If configured according to the ATSC standard, the broadcast unit 102 may employ the MPEG-2 video stream syntax for the coding of video and the Digital Audio Compression (AC-3) Standard for the coding of audio.

The broadcast unit 102 may also subject the digital broadcast data stream 103 to service and multiplex transport operations. As used herein, "service multiplex and transport"

refers to the means of dividing the digital data stream into "packets" of information, the means of uniquely identifying each packet or packet type, and the appropriate methods of multiplexing video data stream packets, audio data stream packets, and ancillary data stream packets into a single data stream. By way of example, and not by way of limitation, digital broadcast unit 102 may employ the MPEG-2 transport stream syntax for the packetization and multiplexing of video, audio, and data signals for digital broadcasting systems. Such packetization and multiplexing is described e.g., ISO/IEC 13818-1:2000 (E), International Standard, Information technology—Generic coding of moving pictures and associated audio information: systems", which is incorporated herein by reference.

The digital broadcast data stream 103 may be converted to a digital broadcast signal 105 through processes referred to as channel coding and modulation. The channel coder takes the data bit stream encoded in the digital broadcast data stream 103 and adds additional information that can be used by a receiving device 110 to reconstruct the data from the received signal which, due to transmission impairments, may not accurately represent the transmitted signal. A modulation subsystem (or physical layer) uses the digital data stream information to modulate the transmitted signal. By way of example and not by way of limitation, the ATSC standard, the modulation subsystem offers two modes. Both modes are based on vestigial sideband modulation. One mode is a terrestrial broadcast mode known as 8-VSB. The other mode is a high data rate mode known as 16-VSB.

A digital broadcast receiving device 110 receives the digital broadcast signal 105 and extracts the digital broadcast data stream 103 including the images I and control data CD encoded within the digital broadcast signal 105. By way of example, and not by way of limitation, the digital broadcast receiving device 110 may include a digital receiver 111, a processor 114, a memory 115, a display 117 and a data storage device 118. The digital broadcast receiving device 110 may be any type of device capable of receiving and utilizing the digital broadcast signal 105. By way of example, the digital broadcast receiving device 110 may be a digital television set, digital radio receiver, personal computer, laptop computer, a mobile or handheld device such as a cellular telephone, mobile internet device or mobile digital television receiver. Furthermore, the term digital broadcast receiving device encompasses "digital media receivers", GPS devices, game consoles, portable game devices, home, mobile or device security systems, and any combination thereof and including other devices for which the present invention may be coupled to provide command and control.

The digital receiver 111 may include one or more tuners 112 and a decoder 113. The tuner(s) 112 may be coupled to an antenna 119 that receives the digital broadcast signal 105. The tuner 112 selects one or more particular frequencies from among the various signals that are picked up by the antenna 119. The tuner 112 and decoder 113 may extract data and generate audio and video signals from the digital broadcast signal 105. By way of example the tuner 112 and decoder 113 may provide the following functions: demodulation, transport stream demultiplexing, decompression, error correction, analog-to-digital conversion, AV synchronization and media reformatting to fit the specific type of display 117 optimally.

As used herein, demodulation refers to the process of transforming the received digital broadcast signal 105 into a usable signal from which data may be extracted and/or from which quality images and sound may be produced.

Transport Stream Demultiplexing may be implemented, e.g., where multiple digital signals are combined and then transmitted from one antenna source to create over the air broadcasts. In such a case, the decoder 113 may decode the digital broadcast data stream 103 and convert it to a suitable form for display of a particular program of the audio and/or video components with the display 117 or for extraction of a broadcast service data stream 108 from the digital broadcast data stream 103. The decoder 113 may implement decompression if the digital broadcast data stream 103 contains data in compressed form. The tuner 112 may decompress such data, e.g., by unpacking compressed packets of digital data to their original size.

The decoder 113 may also implement Error Correction to make sure that any data that is missing from the received digital broadcast signal 105 can be corrected. For instance, sometimes interference or a poor-quality signal will cause the loss of data information that the tuner 112 receives. In such cases, the decoder 112 may perform a number of checks and repair data so that a signal can be viewed on a TV set or data may be utilized by the processor 114.

The decoder 113 may implement AV Synchronization to coordinate audio and video signals being displayed on the display 117 in proper time. AV synchronization ensures that the audio does not lag behind the video that is being displayed on the display 117 or vice versa, so that both audio and video are in sync. Media reformatting allows the display 117 to properly display video images using the data extracted from the digital broadcast signal. Media reformatting is important since the formatting of images on TV sets may differ significantly according to the technology employed. For example, some televisions utilize an interlaced picture, whereas others utilize a progressive-scan picture.

The video images I may be displayed on the video display 117. By way of example, the display 117 may be any suitable video and/or audio-visual display usable with the digital broadcast signal 105. By way of example, and not by way of limitation, the display 117 may include a video monitor, such as a cathode ray tube (CRT), plasma display, liquid crystal display (LCD) or organic light-emitting diode (OLED) display. In addition, the display 117 may include one or more devices for generating audio, e.g., one or more speakers.

The processor 114 may be programmed with instructions SW that use the control data CD to present a perceptible indication that ancillary information is associated with one or more visual components of the images I in conjunction with presenting the images on the display device 117. The instructions SW may use the control data CD to present the ancillary information with the display device in response to an input signal.

As used herein, the term "ancillary information" includes information about a visual component of a video image other than the visual depiction of the component within the image. Such ancillary information may include, but is not limited to information identifying visual component, information providing a history of a real object or concept represented by the visual component, advertisements of products or services associated with the object or concept represented by the visual component.

The receiving device 110 may also implement a back-channel 120 that allows information to be sent from the device to a broadcast unit 102 or a data center affiliated with the broadcast unit. The back channel 120 may be implemented through a digital broadcast signal transmitted from the device 110, e.g., via the antenna 119. Alternatively, the backchannel 120 may be implemented through some other mode of communication such as wireless telephony (e.g., cellular), wireless internet, cable, optical fiber and the like. The back channel 120 may be used to retrieve selected ancillary information 122 from a remote source 124.

The receiving device 110 may also include a data storage device 118 for non-volatile storage of data, such as selected ancillary information 122. Examples of data storage devices include hard disk drives, flash memories, compact disk (CD) drives, digital video disk (DVD) drives, tape drives, and the like.

The processor 114 may execute software program instructions that facilitate the above-referenced functions. In addition, the processor 114 may execute program instructions $SW_1 \ldots SW_p$ for various digital broadcast data services. Data for these data services may be updated as part of the digital broadcast data stream 103 that is carried by the digital broadcast signal 105. The program instructions SW may operate on different portions of control data $CD_1 \ldots CD_p$ for different groups of related video images within the digital broadcast data stream 103. These different portions of control data $CD_1 \ldots CD_p$ may be extracted from the digital broadcast signal 105 and stored, e.g., in the memory 115 or in the data storage 118.

The selection of ancillary information 122 may be filtered from a geographic perspective based on device position information. To facilitate such functionality, the receiving device 110 may optionally include a position location system 116, such as a GPS receiver. For example, in the case of a mobile or hand-held device, GPS data may be used to filter weather and traffic updates and limit downloads to those that are relevant to the area in which the device is presently located. In some embodiments, the function of the position location system 116 may be implemented by one of the tuners 112 in conjunction with software running on the processor 114. The position location signal may originate from one or more of the towers 104.

Figure 2:
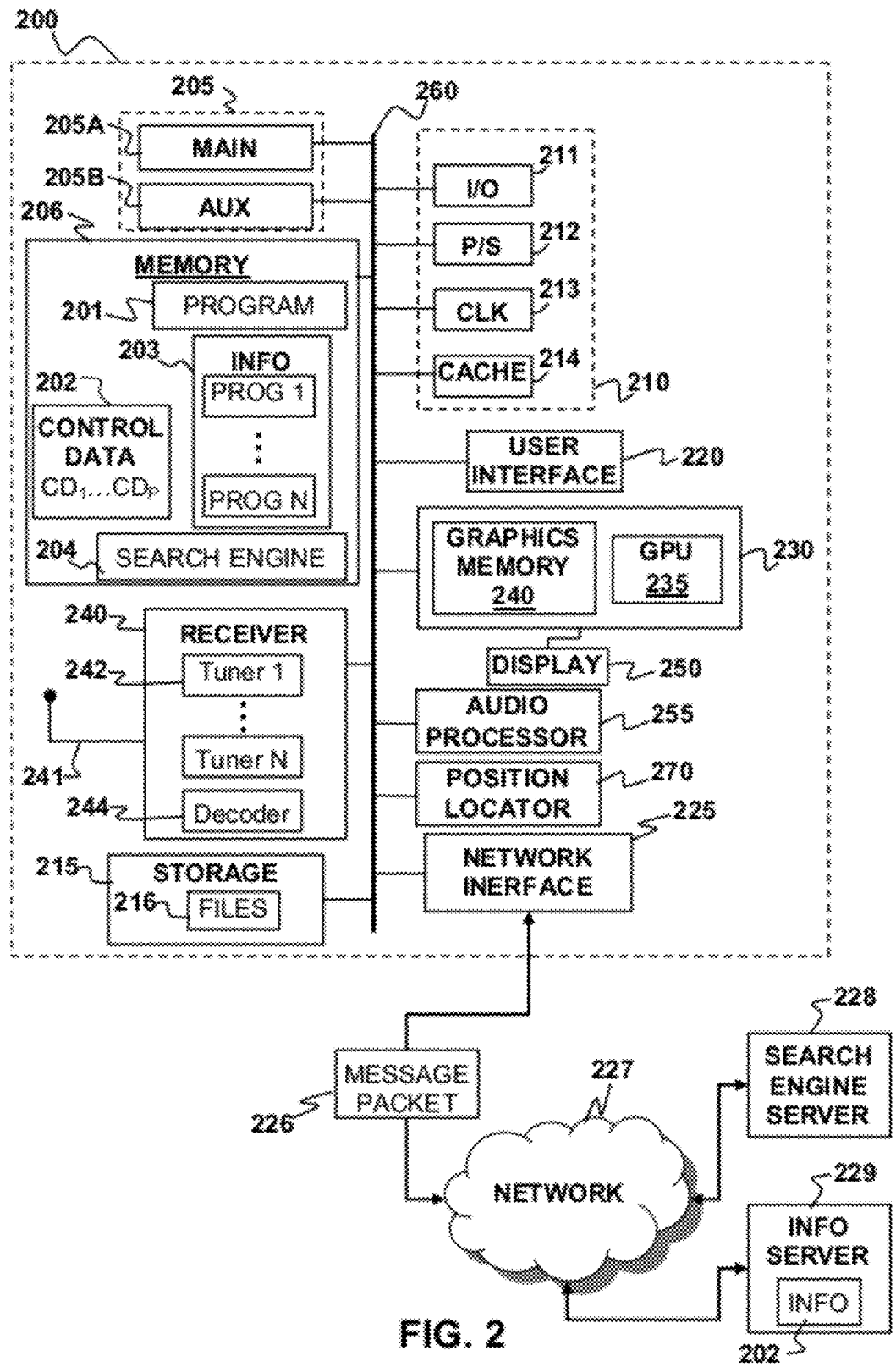
FIG. 2 is a block diagram of a digital broadcast receiving device according to an embodiment of the present invention.

By way of example, a digital broadcast receiving device 200 may be configured as shown in FIG. 2. By way of example, and without loss of generality, the receiving device 200 may be implemented as part of a digital television set, personal computer, video game console, personal digital assistant, mobile or handheld device such as a cellular phone or personal digital assistant, portable email device and the like, or other digital device. The device 200 may include a central processing unit (CPU) 205 and a memory 206 coupled to the CPU 205. The CPU 205 may be configured to run software applications and, optionally, an operating system. Some embodiments of the present invention may take advantage of certain types of processor architecture in which the CPU 205 includes a main processor 205A and one or more auxiliary processors 205B. Each auxiliary processor may have its own associated local data storage. One example, among others of such a processor architecture is a Cell Processor. An example of a Cell Processor architecture is described in detail, e.g., in *Cell Broadband Engine Architecture*, copyright International Business Machines Corporation, Sony Computer Entertainment Incorporated, Toshiba Corporation Aug. 8, 2005 a copy of which may be downloaded at http://cell.scei.co.jp/, the entire contents of which are incorporated herein by reference.

The memory 206 may store applications and data for use by the CPU 205. The memory 206 may be in the form of an integrated circuit, e.g., RAM, DRAM, ROM, and the like). A computer program 201 may be stored in the memory 206 in the form of instructions that can be executed on the processor 205. By way of example, the program 201 may include instructions that when executed by the processor cause implement a method for accessing ancillary information embedded in a digital broadcast data stream. The memory 206 may also store Control data 202 extracted from a received digital broadcast signal. The control data 202 may be used to selectively access ancillary information 203, which may also be stored in the memory 206. The memory may also store instructions for implementing a search engine 204, e.g., by executing the search engine instructions with the CPU 205. The search engine 204 may be configured, e.g., by suitable programming, to search for particular ancillary information 203 using selected control data 202.

The receiving device 200 may also include well-known support functions 210, such as input/output (I/O) elements 211, power supplies (P/S) 212, a clock (CLK) 213 and cache 114. The device 200 may further include a fast data storage device 215 such as a hard disk drive that provides non-volatile storage for applications and data. The fast storage device 215 may be used for temporary or long-term storage of files 216 retrieved from a slower data storage device. By way of example, the storage device 215 may be a fixed disk drive, removable disk drive, flash memory device, tape drive. Alternatively, storage device 215 may be, e.g., a CD-ROM, DVD-ROM, Blu-ray, HD-DVD, UMD, or other optical storage devices. Files 216 from a slower storage device may be temporarily stored in a faster storage device in a hardware cache for quick loading into the memory 206.

The device 200 may include a digital broadcast receiver 240 which may be coupled to an antenna 241. One or more digital broadcast tuners 242 may receive digital broadcast signals picked up by the antenna 241. The receiver 240 may further include a decoder 244, which may implement the functions described above.

One or more user input devices 220 may be used to communicate user inputs from one or more users to the system 200. By way of example, one or more of the user input devices 220 may be coupled to the client device 200 via the I/O elements 211. Examples of suitable input device 220 include keyboards, mice, joysticks, touch pads, touch screens, remote control units, light pens, still or video cameras, and/or microphones.

The client device 200 may include a network interface 225 to facilitate communication via an electronic communications network 227. The network interface 225 may be configured to implement wired or wireless communication over local area networks and wide area networks such as the Internet. The system 200 may send and receive data and/or requests for files via one or more message packets 226 over the network 227.

The system 200 may further comprise a graphics subsystem 230, which may include a graphics processing unit (GPU) 235 and graphics memory 240. The graphics memory 240 may include a display memory (e.g., a frame buffer) used for storing pixel data for each pixel of an output image. The graphics memory 240 may be integrated in the same device as the GPU 235, connected as a separate device with GPU 235, and/or implemented within the memory 206. Pixel data may be provided to the graphics memory 240 directly from the CPU 205. Alternatively, the graphics unit may receive video signal data extracted from a digital broadcast signal from the decoder 240. Alternatively, the CPU 205 may provide the GPU 235 with data and/or instructions defining the desired output images, from which the GPU 235 may generate the pixel data of one or more output images. The data and/or instructions defining the desired output images may be stored in memory 206 and/or graphics memory 240. In an embodiment, the GPU 235 may be configured (e.g., by suitable programming or hardware configuration) with 3D rendering capabilities for generating pixel data for output images from instructions and data defining the geometry, lighting, shading, texturing, motion, and/or camera parameters for a scene. The GPU 235 may further include one or more programmable execution units capable of executing shader programs.

The graphics subsystem 230 may periodically output pixel data for an image from the graphics memory 240 to be displayed on a video display device 250. The video display device 250 may be any device capable of displaying visual information in response to a signal from the device 200, including CRT, LCD, plasma, and OLED displays that can display text, numerals, graphical symbols or images. The digital broadcast receiving device 200 may provide the display device 250 with a display driving signal in analog or digital form, depending on the type of display device. In addition, the display 250 may include one or more audio speakers that produce audible or otherwise detectable sounds. To facilitate generation of such sounds, the client device 200 may further include an audio processor 255 adapted to generate analog or digital audio output from instructions and/or data provided by the CPU 205, memory 206, and/or storage 215.

The receiving device 200 may optionally include a position location device 270. Such a device may be based on any suitable technology capable of providing information on the geographic location of a device. Examples of existing technology include global positioning satellite (GPS) technology, inertial guidance technology, and the like. Information from such devices may be used in digital broadcast data applications such as navigation for mobile or hand-held devices.

The components of the device 200, including the CPU 205, memory 206, support functions 210, data storage devices 215, user input devices 220, network interface 225, graphics unit 230, audio processor 255 and position location device 270 may be operably connected to each other via one or more data buses 260. These components may be implemented in hardware, software or firmware or some combination of two or more of these.

Figure 3:
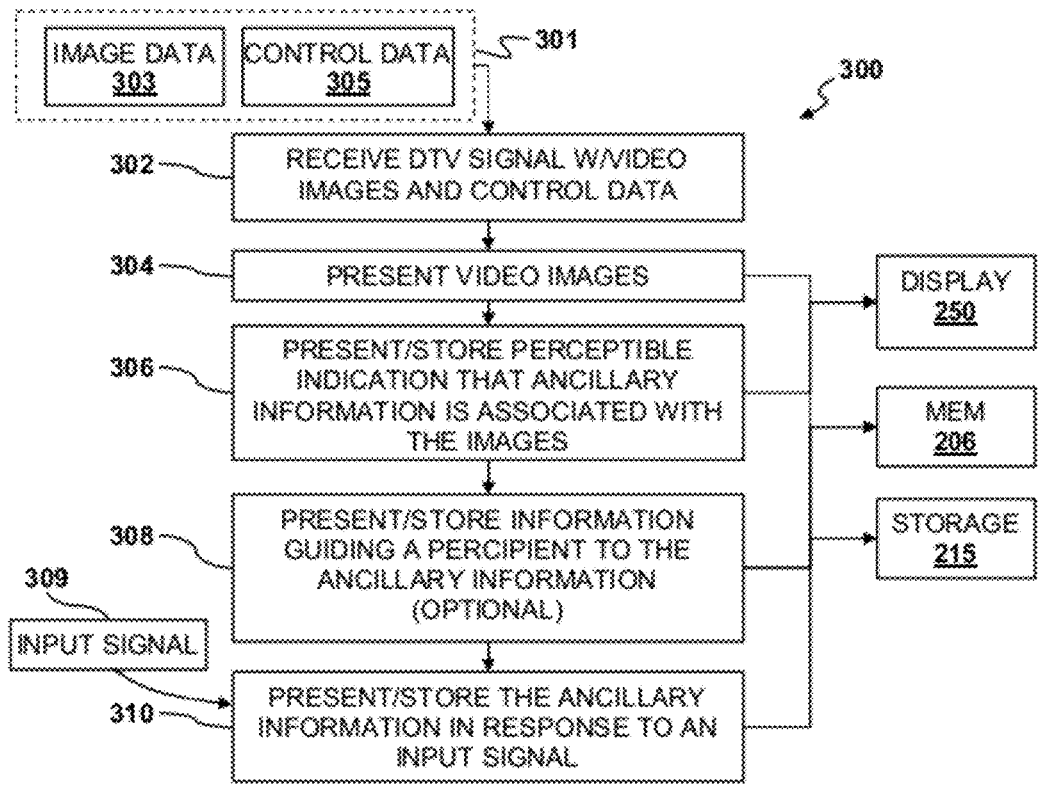
FIG. 3 is a flow diagram illustrating a method for accessing ancillary information associated with an image embedded in a digital broadcast data stream according to an embodiment of the present invention.

By way of example, and not by way of limitation, the program 201 may locate and present ancillary information in accordance with a method 300 depicted in the flow diagram of FIG. 3. As indicated at 302 the receiving device 200 may receive a digital television broadcast signal 301. The digital broadcast signal 301 includes coded data representing one or more video images 303 and control data 305 associated with one or more visual components of the images 303. The decoder 244 may convert the coded control image data 303 into image data usable by the graphics subsystem 230 and display 250. The decoder 244 may similarly convert the coded control data 305 to control data 202 usable by the program 201 and CPU 205.

Figure 4:
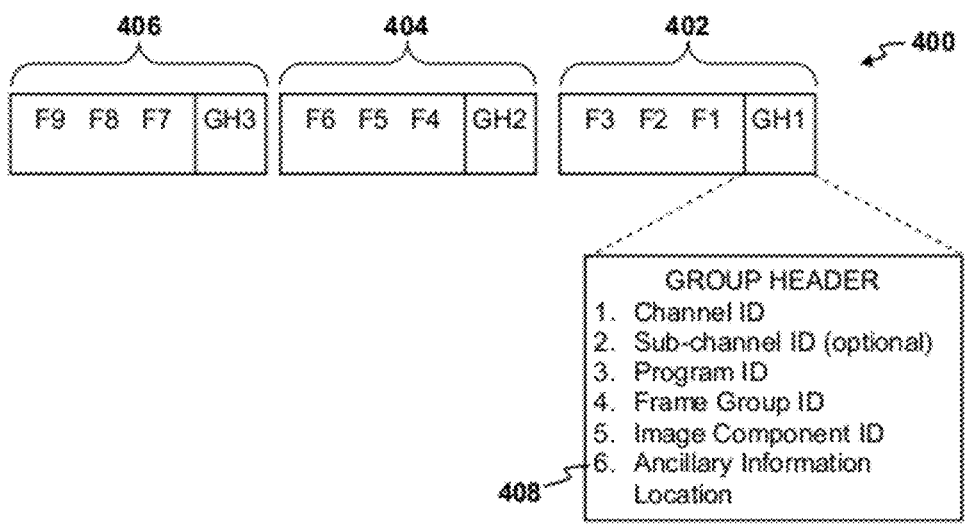
FIG. 4 is a schematic diagram of a digital broadcast data stream that may be used in conjunction with embodiments of the present invention.

By way of example, the broadcast signal may be configured as depicted in FIG. 4. Specifically, a digital broadcast signal 400 may include data representing one or more video frame groups 402, 404, 406. Each frame group may have a group header 408 and a plurality of video frames F. The frames $F_1 \ldots F_9$ within the frame groups 402, 404, 406 may be related to each other within some context. For example, the frames within a given frame group may be part of particular, scene, shot or sequence of scenes or shots. The scenes or shots may be related by virtue of containing the same characters or objects or may be related to each other in terms of where they occur in the course of the plot of a particular program or episode.

In some embodiments, the control data associated with a corresponding video frame group may be included in the group header for that frame group. By way of example a group header 408 may be associated with a frame group 402 containing data for video frames $F_1$, $F_2$ and $F_3$. By way of example the group header 408 may be a data packet containing the control data in some coded form that may be utilized by the program 201. Examples of suitable control data include, but are not limited to, information identifying the particular broadcast channel, sub-channel, program or frame group with which the control data is associated. Furthermore, the control data may identify particular visual components within the frames $F_1$, $F_2$, $F_3$ that make up the frame group 402. In addition, the control data may identify a location of ancillary information associated with one or more visual components of the frames F.

By way of example, program 201 may include a network protocol stack that may be used to facilitate communication over the network 227. The control data in the header 408 may include mark-up language code (e.g., HTML, XML and the like) that provides a universal resource locator (URL) for network resource (e.g., a website) from which ancillary information may be obtained. Alternatively, the control data in the header 408 may include text descriptors that may be used as inputs to the search engine 204.

Figure 5A:
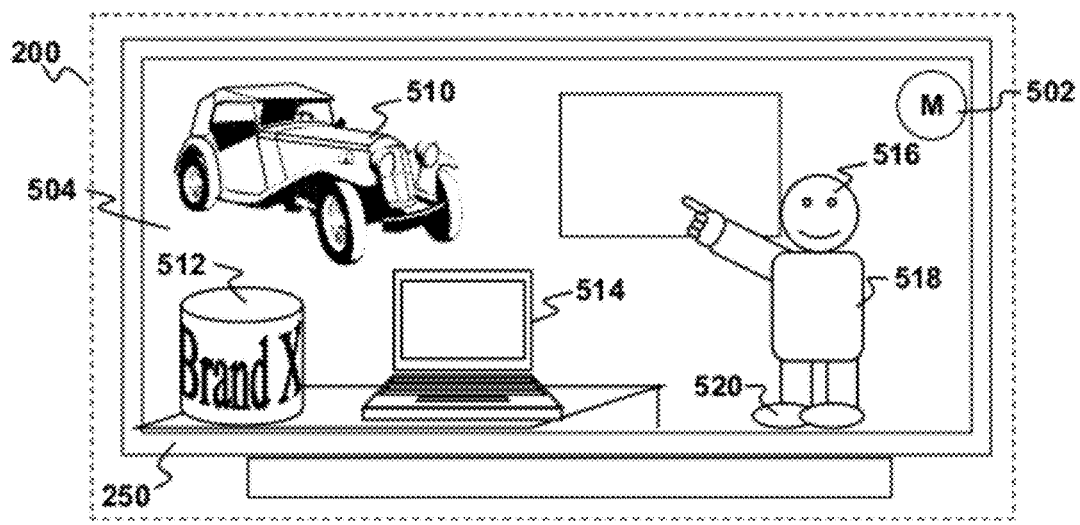
FIGS. 5A-5D illustrate examples of accessing ancillary information associated with an image embedded in a digital broadcast data stream according to an embodiment of the present invention.
Figure 5A:
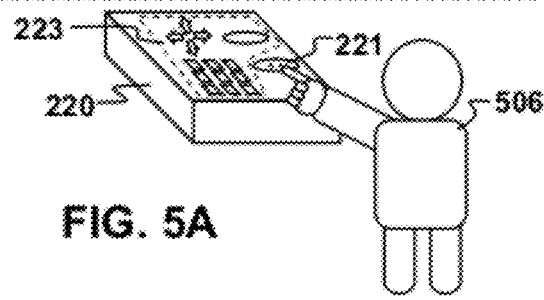

As indicated at 304, the video images corresponding to the image data 303 may be presented, e.g., using the display device 250. As indicated at 306, the program 201 may use the control data 202 to present a perceptible indication that ancillary information is associated with the one or more visual components in conjunction with presenting the one or more video images with the display device. For example, as shown in FIG. 5A, the display 250 may display a symbol 502 that is associated with the presence of ancillary information associated with a video image 504 (or group of such images) that is concurrently displayed. The presence of a symbol notifies a percipient 506 of the availability of the ancillary information. For the purposes of this disclosure, a percipient is one whose senses are stimulated by an output from the display device 250.

In some embodiments, the program 201 may optionally be configured to present guiding information that directs the percipient 506 to the ancillary information, as indicated at 308. As indicated at 310, the program 201 may use the control data 202 to present or store the ancillary information in response to an input signal 309. By way of example, and not by way of limitation, the control data 305 associated with the image 504 may include a URL for a web page associated with a frame group that includes the image 504. The web page may display the ancillary information in any suitable form. For example, the ancillary information may be in the form of links to various sources of information related to the visual components of the image 504. Such links may be grouped according to their association with a particular visual component of the image 504. Such links may be activated, e.g., through a signal from the interface 220.

For example, the user interface 220 may be in the form of a remote control of a type commonly used with a television set or DVR. The interface 220 may include a pause button 221 and one or more control buttons 223 which may include arrow buttons and numbered buttons. The percipient 506 may see something of interest in the image 504. In such a case, the percipient 506 may activate the pause button 221 to freeze the display of the program of which the image 504 is a part. Ancillary information 203 may be presented by the display 250 or stored in the memory 206 or storage 215 in response to a signal initiated by the percipient's activation of the pause button 221 or by a signal generated in response to activation of one or more of the control buttons 223 or some combination of both.

The program 201 may use the control data 202 to access ancillary information 203 residing in the memory 206 or storage 215 or remote ancillary information residing on one or more servers 229 coupled to the network 227. The program 201 may utilize one or more portions of the control data 202 as input to a search engine 204 resident in memory 206 or may access a remote search engine server 228 via the network interface 226 and the network 227 for this purpose. By way of example, the control data 202 may include text descriptors associated with visual components of the video images as inputs to the search engine 204 or the search engine server 229.

Figure 5B:
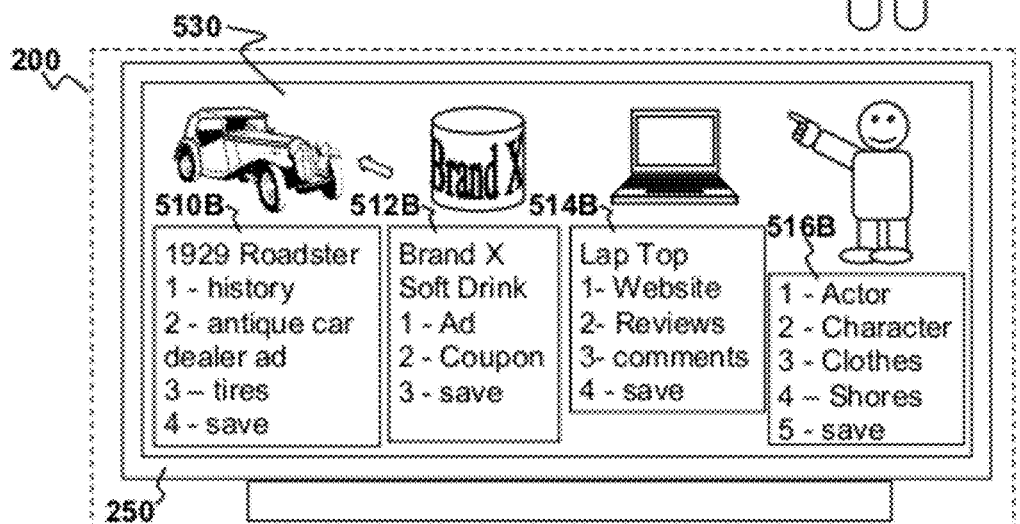
Figure 5B:
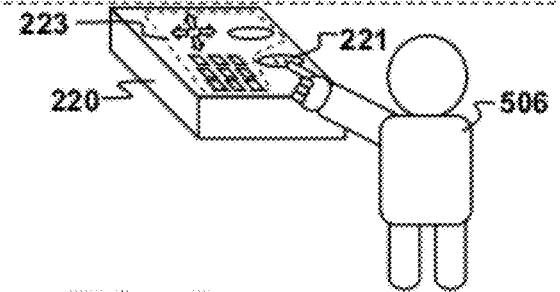

There are a number of ways in which guiding information or ancillary information may be presented. For example, suppose that the image 504 depicts an automobile 510, a soft drink can 512, a laptop computer 514, an actor 516 portraying a character and wearing clothes 518 and shoes 520. Upon receipt of the signal from the interface 220, the program 201 may use the control data 202 associated with the image 504 to cause the display 250 to present a menu 530, as shown in FIG. 5B containing listings 510B, 512B, 514B and 516B for the automobile 510, soft drink can 512, laptop 514 and actor 516. Each of these listings may provide ancillary information (e.g., in the form of text or images) or guiding information associated with ancillary information. Guiding information may be in the form of links to information resident in the memory 206, storage 215 or at the remote server 229. In the example depicted in FIG. 5B a particular listing may be selected, e.g., using left-right or up-down arrow keys on the interface 220. A given link within a listing may be activated by pressing a numbered control button on the interface 220 corresponding to a number listed next to the link.

By way of example, listing 510B for the automobile 510 may include links to web pages describing the history of the particular make and model of automobile, an advertisement for a dealership that sells that particular make or model, or for a dealership that sells the tire depicted on the automobile 510. The listing 512B for the soft drink can 512 may include links to the web page of the soft drink company, an advertisement for the soft drink or a coupon for the soft drink. The listing 514B for the laptop computer 514 may include a links to websites for the laptop manufacturer or dealer, reviews of the particular brand of laptop depicted or technical help for the laptop. The listing 516B for the actor 516 may include links to information regarding either the actor or the character portrayed or information regarding the clothes 518 or shoes 520 that the actor is wearing in the image 504.

Figure 5C:
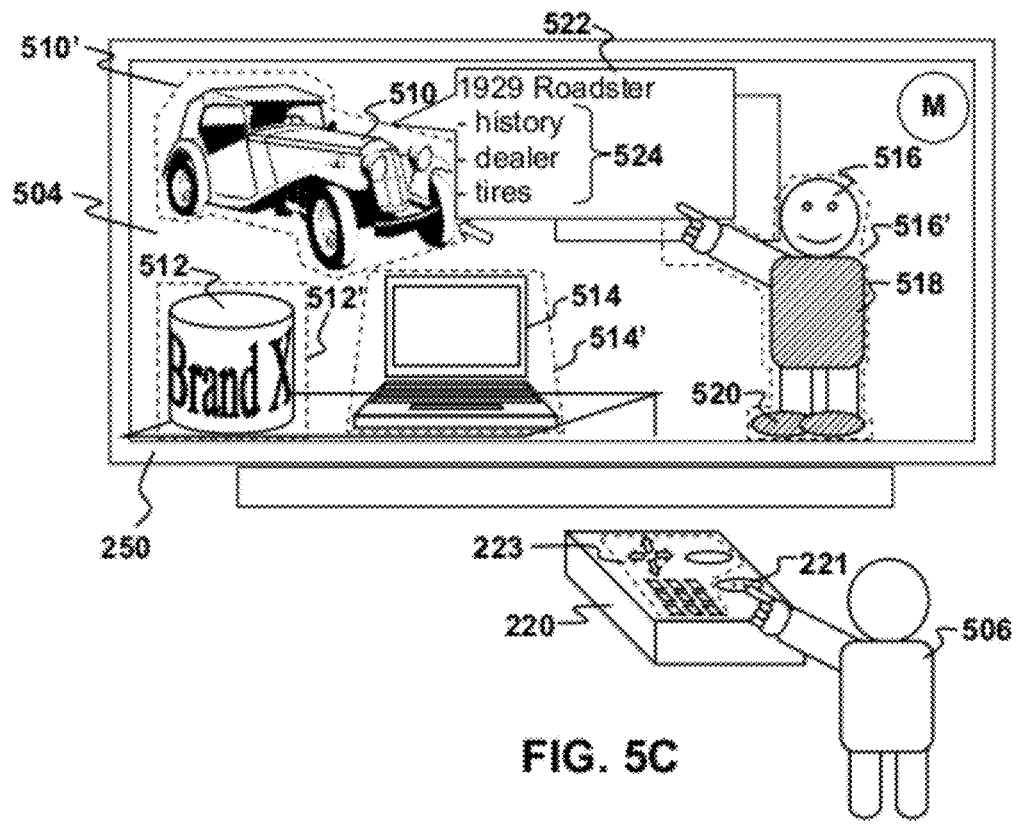

In some embodiments, information guiding the percipient to the ancillary information may be superposed over one or more of the video images presented by the display. For example, as shown in FIG. 5C, a program may be paused at a particular frame 505, in response to a signal from the input device 220 that is generated when the pause button 221 is activated. The program 201 may highlight certain visual components within the image in a manner perceptible to a percipient 506 if those components have ancillary information associated with them. Highlighted regions of a video image that are associated with ancillary data are sometimes referred to herein as "hotspots". By way of example, and not by way of limitation, as shown in FIG. 5C, portions of the image 504 containing the automobile 510, soft drink can 512, laptop 514, and actor 516 may be surrounded by dashed polygons 510', 512', 514' and 516', that mark the boundaries of hotspots. In addition, the actor's clothes 518 and shoes 520 may be shaded to stand out from the rest of the image 504, thereby identifying these regions as hotspots.

Digital links to the ancillary information associated with these visual components may be associated with the corresponding portions of the image 504 that mark the hotspots. The ancillary information associated with a particular visual component may be presented in response to a selection input. For example, the input device may include selection buttons that can be used to select the particular image portion. Alternatively, the display device 250 may include a touch screen on which the image 504 is displayed. In such a case, a particular highlighted portion of the image 504 may be selected by touching the corresponding region of the touch screen on which it is presented. The information guiding the percipient to the ancillary information (or the ancillary information itself) may be presented in the form of "bubble text" 522 that appears next to the corresponding portion of the image 504. The "bubble text" 522 may include one or more links 524 to resources containing the ancillary information.

Figure 5D:
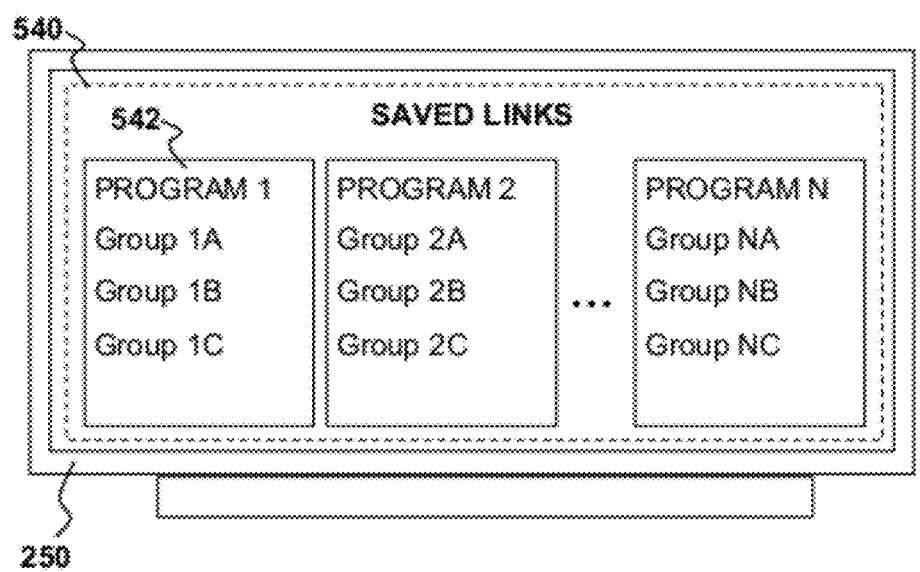

In some embodiments, ancillary information (or guiding information) may be stored for later review. For example, ancillary information retrieved from the remote source 229 may be stored in the memory 206 or the storage device 215. In some implementations of this embodiment, stored ancillary information (or guiding information) may be subsequently retrieved. By way of example, and not by way of limitation, FIG. 5D illustrates an example of a presentation of saved guiding information 540 presented on the display device 250. In this example, the guiding information is in the form of a plurality of menu lists 542. Each menu list may correspond to a particular program or episode of a particular program. The lists may be broken down by frame group, with each list corresponding to a different frame group. The program 201 may generate the lists as the percipient 506 selects ancillary information or guiding information to be saved. The lists 542 may include links to the ancillary information (or guiding information) for the frame group. For example, selecting the link marked group 1A may cause the program 201 to present a menu, such as the menu 530 depicted in FIG. 5B.

Figure 6:
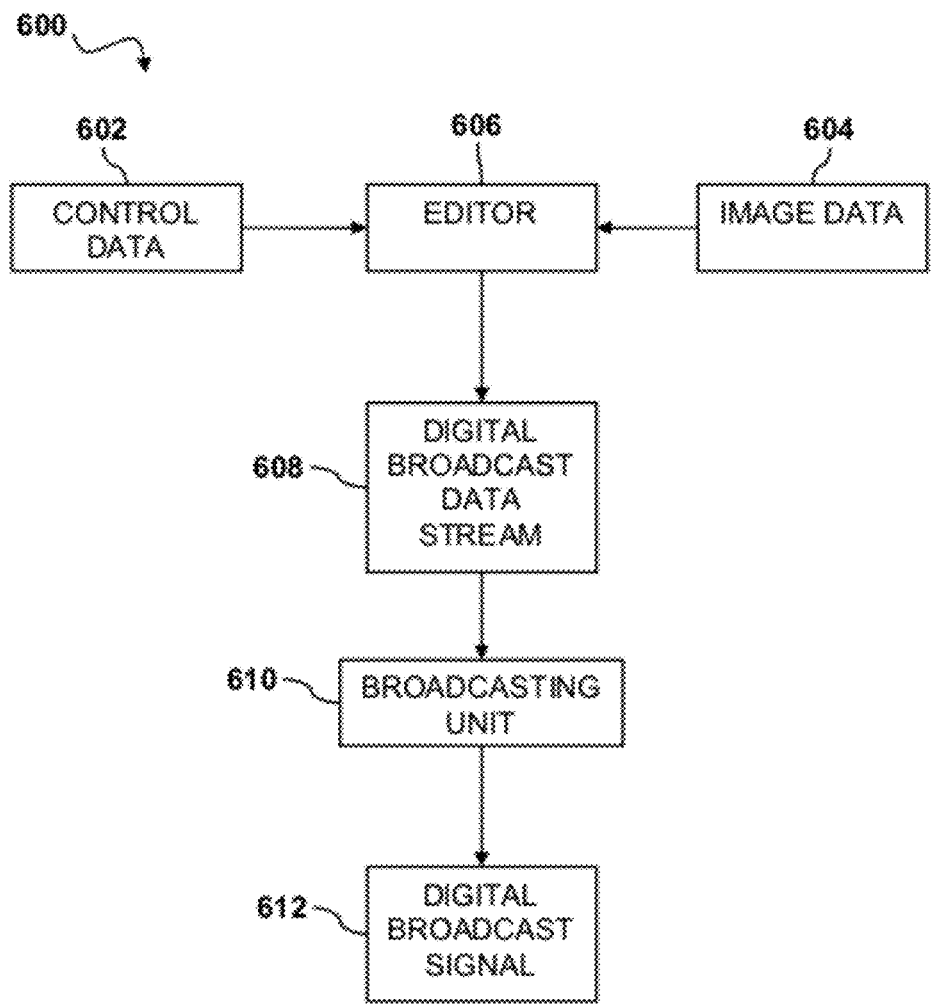
FIG. 6 is a block diagram illustrating method for providing a digital broadcast data stream having control data associated with an image in a digital broadcast data stream according to an embodiment of the present invention.

According to another embodiment of the present invention a digital broadcast data stream may be provided as illustrated with respect to FIG. 6. According to a method 600, video control data 602 may be associated with one or more images 604 in a digital broadcast data stream 608. By way of example, the control data may be associated with one or more visual components of one or more video images using an editor 606.

By way of example, the editor may introduce time-varying sensitive regions into portions of one or more video images. Examples of techniques for introducing such sensitive regions are described, e.g., in "Time-Varying Sensitive Regions in Dynamic Multimedia Objects: a Pragmatic Approach to Content-Based Retrieval from Video" by Victoria Burrill, Thomas Kirste and Jochen Weiss, Information and Software Technology 1994, Volume 36, Number 4, the entire contents of which are incorporated herein by reference.

The digital broadcast data stream 608 may be coupled to a digital broadcasting unit 610, which converts the digital broadcast data stream 608 to a digital broadcast signal 612. The broadcasting unit 610 may be any system commonly used to convert data to a format suitable for broadcast according to a digital broadcasting standard, such as the ATSC standard. The broadcasting unit may include a transmitter and broadcast tower with an antenna for transmitting the signal 612 over the airwaves. Alternatively, the broadcast signal 612 may be transmitted to a separate transmitting unit for this purpose.

The control data 602 may be configured to facilitate access to ancillary data associated with the visual components when the digital broadcast signal 612 is received and/or the video images 604 are displayed, as discussed above. By way of example, the control data 602 may be associated with one or more objects depicted in one or more of the video images or a context of the one or more video images. The control data 602 may identify one or more hotspots associated with one or more of the video images 604. Each hotspot may provide a link to ancillary information associated with one or more visual components in the hotspot. The control data 602 may be configured to cause a display device to present guiding information, as discussed above.

While the above is a complete description of the preferred embodiment of the present invention, it is possible to use various alternatives, modifications and equivalents. Therefore, the scope of the present invention should be determined not with reference to the above description but should, instead, be determined with reference to the appended claims, along with their full scope of equivalents. Any feature described herein, whether preferred or not, may be combined with any other feature described herein, whether preferred or not. In the claims that follow, the indefinite article "A", or "An" refers to a quantity of one or more of the item following the article, except where expressly stated otherwise. The appended claims are not to be interpreted as including means-plus-function limitations, unless such a limitation is explicitly recited in a given claim using the phrase "means for".

What is claimed is:

1. A method for accessing ancillary information associated with one or more images embedded in a digital broadcast data stream, the method comprising:
   a) receiving a digital broadcast signal, wherein the digital broadcast signal includes data representing one or more video images and control data associated with one or more visual components of the one or more video images, wherein the control data includes different control data components for different corresponding visual components within the same video image, where control data components have text descriptors associated with said different corresponding visual components;
   b) presenting the one or more video images on a video display device associated with the digital broadcast receiving device;
   c) providing information guiding a percipient to ancillary information that is superposed to show said text descriptors over one or more visual components of the one or more video images; and
   d) receiving selection of one of said text descriptors for one of said visual components presented on the video display device;
   e) using a control data component including said text descriptor associated with said visual component as an input to a search engine coupled to the digital broadcast receiving device and/or video display device and conducting a search using said text descriptor with the search engine for obtaining ancillary information at a time of said selection of the text descriptor for said visual component presented on the video display device, wherein the ancillary information obtained for the visual component is filtered based on a current geographic location of the video display device so as to include ancillary information that is relevant to the current geographic location.

2. The method of claim 1, wherein the control data is associated with one or more objects depicted in one or more of the video images; or wherein the control data is associated with a context associated with the one or more video images; or wherein the input signal is a signal from a remote control associated with the digital broadcast receiving device; or wherein the ancillary information includes one or more advertisements.

3. The method of claim 1 wherein c) includes displaying a perceptible indication with the display device while presenting the one or more video images; or wherein c) includes highlighting the one or more visual components in a manner perceptible to the percipient, and associating one or more links to the ancillary information associated with the one or more highlighted visual components.

4. The method of claim 3 wherein the information guiding the percipient to the ancillary information includes one or more links to one or more resources accessible via an electronic communications network.

5. The method of claim 4 wherein e) includes accessing the one or more resources via the one or more links in response to the input signal.

6. The method of claim 1 wherein the information guiding the percipient to the ancillary information includes a video image identifying the one or more visual components, wherein the image includes one or more links, each link being associated with one or more of the visual components, wherein each link is configured to provide access to the ancillary information associated with the corresponding visual component.

7. The method of claim 1 wherein e) further includes storing the ancillary information in a memory associated with the digital broadcast receiving device and/or display device; or wherein d) further includes presenting ancillary information associated with a particular visual component of the one or more visual components in response to a selection input.

8. A digital broadcast receiving device, comprising:
   a receiver unit configured to receive programming and data over one or more digital broadcast channels;
   a processor coupled to the receiver unit;
   a memory coupled to the processor;
   a set of processor readable instructions embodied in the memory for execution on the processor, the instructions being configured to implement a method for accessing control data associated with the one or more images embedded in a digital broadcast data stream, the method comprising:
   a) receiving a digital broadcast signal, wherein the digital broadcast signal includes data representing one or more video images and control data associated with one or more visual components of the one or more video images, wherein the control data includes different control data components for different corresponding visual components within the same video image;
   b) presenting the one or more video images on a video display device associated with the digital broadcast receiving device;
   c) providing information guiding a percipient to the ancillary information that is at least partially superposed over one or more visual components of the one or more video images, the information guiding the percipient includes text descriptors that are associated with ones of said visual components; and d) responsive to receiving a selection via touch input of one of said text descriptors associated with one or more visual components of one or more video images, using said selected text descriptor as an input to a search engine coupled to the digital broadcast receiving device and/or display device and causing a search to be conducted with the search engine for obtaining said ancillary information at a time that is responsive to said search associated to one or more corresponding visual components of one or more video images presented on the video display device of the receiver unit, wherein the ancillary information obtained for the visual component is filtered based on a current geographic location of the video display device so as to include ancillary information that is relevant to the current geographic location.

9. The device of claim 8, wherein the input is generated responsive to the touch input on a touch screen of the video display device.

10. The device of claim 8, further comprising a backchannel coupled to the processor wherein the backchannel comprises a network interface coupled to an electronic communications network.

11. The device of claim 8 wherein c) includes displaying at least one additional perceptible indication with the display device while presenting the one or more video images.

12. The device of claim 11 wherein the information guiding the percipient to the ancillary information additionally includes one or more links to one or more resources accessible via an electronic communications network.

13. The device of claim 12 wherein the one or more links are configured to access the one or more resources in response to the input.

14. The device of claim 11 wherein the information guiding the percipient to the ancillary information further includes a video image identifying the one or more visual components, wherein the image further includes one or more links, each hot link being associated with one or more of the visual components, wherein each hot link is configured to provide access to the ancillary information associated with the corresponding visual component.

15. The device of claim 11 wherein d) includes presenting the ancillary information associated with a particular visual component of the one or more visual components in response to a selection.

16. The device of claim 8 wherein d) includes storing the ancillary information in the memory of the receiver unit.

* * * * *